United States Patent
Luo et al.

(10) Patent No.: US 7,999,520 B2
(45) Date of Patent: Aug. 16, 2011

(54) STATIC PHASE SHEDDING FOR VOLTAGE REGULATORS BASED UPON CIRCUIT IDENTIFIERS

(75) Inventors: Shiguo Luo, Austin, TX (US); John J. Breen, Harker Heights, TX (US); Hongtao Zhao, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 699 days.

(21) Appl. No.: 12/148,830

(22) Filed: Apr. 23, 2008

(65) Prior Publication Data

US 2009/0267578 A1 Oct. 29, 2009

(51) Int. Cl.
*G05F 1/577* (2006.01)
(52) U.S. Cl. .................. 323/267; 323/282
(58) Field of Classification Search .......... 323/267, 323/268, 269, 272, 282, 283, 350, 351
See application file for complete search history.

(56) References Cited

U.S. PATENT DOCUMENTS

| | | | |
|---|---|---|---|
| 6,281,666 B1 | 8/2001 | Tressler et al. | 323/272 |
| 6,674,274 B2 | 1/2004 | Hobrecht et al. | 323/285 |
| 7,294,976 B1 * | 11/2007 | Andric et al. | 315/291 |
| 7,298,601 B2 * | 11/2007 | Covi et al. | 361/56 |
| 7,383,145 B2 * | 6/2008 | Tabaian et al. | 702/106 |
| 7,414,383 B2 * | 8/2008 | Burton et al. | 323/271 |
| 7,804,733 B2 * | 9/2010 | Alexander et al. | 365/226 |
| 2002/0135338 A1 | 9/2002 | Hobrecht et al. | 323/272 |
| 2006/0001408 A1 * | 1/2006 | Southwell et al. | 323/282 |
| 2008/0162963 A1 * | 7/2008 | Kung et al. | 713/320 |
| 2008/0169797 A1 * | 7/2008 | Zambetti et al. | 323/285 |
| 2008/0238390 A1 * | 10/2008 | Trivedi et al. | 323/283 |

\* cited by examiner

*Primary Examiner* — Adolf Berhane
(74) *Attorney, Agent, or Firm* — O'Keefe, Egan, Peterman & Enders, LLP

(57) ABSTRACT

Systems and methods are disclosed that provide static phase shedding techniques to improve the efficiency of multi-phase voltage regulators within information handling systems by selecting the number of active phases for the multi-phase voltage regulators using circuit identifiers (IDs) for circuitry configured to be powered by the multi-phase voltage regulators, such as central processing units (CPUs). In one embodiment, processor identifier information related to installed CPUs is used to control the voltage regulator (VR) phase number to provide static phase shedding. This VR control can be implemented in a variety of ways, including the use of conventional analog multi-phase VR controllers and/or digital VR controllers. Dynamic phase shedding can also be used in conjunction with this static phase shedding to further reduce the number of active phases when a processor operates in a low power mode.

21 Claims, 6 Drawing Sheets

FIG. 4

Power loss data and power saving from phase shedding

| Load current (A) | 0.0 | 5.0 | 10.0 | 15.0 | 20.0 | 25.0 | 30.0 | 35.0 | 40.0 | 45.0 | 50.0 | 55.0 | 60.0 | 65.0 | 70.0 | Phase shedding controlled by |
|---|---|---|---|---|---|---|---|---|---|---|---|---|---|---|---|---|
| 6 phase Pd (W) | 5.5 | 5.6 | 5.7 | 6.0 | 6.2 | 6.6 | 7.0 | 7.4 | 7.9 | 8.5 | 9.1 | 9.9 | 10.7 | 11.6 | 12.5 | N/A |
| 5 phase Pd (W) | 4.6 | 4.7 | 4.9 | 5.1 | 5.4 | 5.8 | 6.3 | 6.8 | 7.4 | 8.0 | 8.9 | 9.7 | 10.7 | 11.7 | 12.8 | |
| 4 phase Pd (W) | 3.7 | 3.8 | 4.0 | 4.3 | 4.7 | 5.1 | 5.7 | 6.3 | 7.1 | 8.0 | 8.9 | 9.9 | 11.1 | 12.3 | 13.5 | |
| 3 phase Pd (W) | 2.8 | 3.0 | 3.2 | 3.6 | 4.0 | 4.6 | 5.3 | 6.2 | 7.2 | 8.3 | 9.5 | 10.7 | 12.1 | 13.6 | 15.3 | |
| 2 phase Pd (W) | 2.0 | 2.1 | 2.5 | 2.9 | 3.6 | 4.5 | 5.5 | 6.7 | 8.1 | 9.6 | 11.2 | 13.0 | 15.0 | | | |
| 1 phase Pd (W) | 1.1 | 1.3 | 1.9 | 2.7 | 3.8 | 5.2 | 6.9 | 8.8 | 11.0 | | | | | | | |
| power saving of phase shedding from 6 to 5 | 0.9 | 0.9 | 0.9 | 0.9 | 0.8 | 0.8 | 0.7 | 0.6 | 0.6 | 0.4 | 0.2 | 0.1 | 0.0 | -0.1 | -0.3 | CPLD (STATIC) |
| power saving of phase shedding from 6 to 4 | 1.7 | 1.7 | 1.7 | 1.6 | 1.6 | 1.4 | 1.3 | 1.1 | 0.8 | 0.5 | 0.2 | -0.1 | -0.4 | -0.7 | -1.0 | |
| power saving of phase shedding from 6 to 3 | 2.6 | 2.6 | 2.5 | 2.4 | 2.2 | 2.0 | 1.6 | 1.2 | 0.7 | 0.2 | -0.4 | | | | | |
| power saving of phase shedding from 6 to 2 | 3.5 | 3.4 | 3.3 | 3.0 | 2.6 | 2.1 | 1.4 | | | | | | | | | PSI (DYNAMIC) |
| power saving of phase shedding from 6 to 1 | 4.3 | 4.2 | 3.9 | 3.2 | 2.4 | 1.3 | 0.1 | | | | | | | | | |
| power saving of phase shedding from 4 to 2 | 1.7 | 1.7 | 1.6 | 1.4 | 1.1 | 0.6 | 0.1 | | | | | | | | | |
| power saving of phase shedding from 4 to 1 | 2.6 | 2.5 | 2.2 | 1.6 | 0.8 | -0.1 | -1.3 | | | | | | | | | |

US 7,999,520 B2

STATIC PHASE SHEDDING FOR VOLTAGE REGULATORS BASED UPON CIRCUIT IDENTIFIERS

TECHNICAL FIELD

The techniques described herein relate to voltage regulators for circuitry such as central processing units (CPUs) on computer motherboards and, more particularly, to the controlling the regulated voltage provided by voltage regulators to such circuitry.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Current information handling systems have used direct-current-to-direct-current (DC-DC) voltage regulators to provide regulated voltages to central processing units (CPUs) and other circuitry on computer motherboards. A DC-DC voltage regulator (VR) usually includes a controller, one or more MOSFET (metal oxide semiconductor field effect transistor) drivers and one or more power stages. And a power stage typically includes MOSFETs and an inductor, as shown and described with respect to FIG. 6 (prior art).

FIG. 6 (prior art) depicts an embodiment 600 of FIG. 6 (prior art), a MOSFET driver 602 receives a regulated power supply $V_{DD}$ and provides signals to the power stage 606. The power stage 606 includes a first MOSFET (Q1) that is driven by the DH signal, a second MOSFET (Q2) that is driven by the DL signal, and an inductor L1 that receives the LX signal. The first MOSFET (Q1) is coupled between a voltage input (Vin) 612 (e.g., 9 to 20 volts) and node 610. The second MOSFET (Q2) is coupled between node 610 and ground 614. And the inductor L1 is coupled between node 610 and the output voltage node (Vout) 608. A capacitor couples the voltage input node 612 to ground, and a capacitor (C1) couples the voltage output node 608 to ground. A VR controller 604 receives a separate power supply $V_{CC}$ and operates to control the MOSFET driver 602. Two resistors (R1, R2) coupled between the voltage output node 608 and ground provide a divided voltage as a feedback (FB) signal to the VR controller 604. The VR controller also has a ground (GND) connection to ground 614, and an output (OUT) connection to the voltage output node 608. It is noted that $V_{CC}$ and $V_{DD}$ are bias power supplies for the VR controller and MOSFET driver, respectively, and these power supplies may be drawn from the voltage input (Vin) or from different voltage source, as desired.

When a CPU is being powered, the power rating of the VR depends upon the power requirements of the CPU. As such, voltage regulators for computer motherboards are typically designed considering the CPUs expected to be installed in the motherboard. More particularly, CPU voltage regulators often have a plurality of power stages that work together to form a multiphase VR. The number of phases of a VR can be selected depending upon the power requirements of the CPUs to be installed within the system. Typically, voltage regulators are designed to support the highest performance CPU that may be installed in the system, and such CPU usually has maximum power consumption. To facilitate the design of voltage regulators for system motherboards, one prior solution provided stackable power stages for voltage regulators so that phases could be added in a stackable fashion in implementing the voltage regulation to meet increased power demand.

In addition to the design of multiphase voltage regulators for a particular system motherboard, the regulated voltage provided by voltage regulators have also been managed dynamically during operation of a system depending upon processor load levels or power modes. One prior solution used a plurality of single-phase switching regulators to provide power to a CPU and used a comparator to monitor the load current drawn by the CPU. One or more of the single phase switching regulators would then be turned off when a low load current threshold was reached. In addition, at least one of the single phase switching regulators that remained on could increase its output current so that the multiple phase switching regulator output current continued to match the load current. These prior methods have not been successfully implemented in a CPU VR because there is not enough time for the VR to respond adequately to CPU transient operation.

Dynamic phase shedding refers to a similar concept of providing a means of increasing voltage regulator efficiency at light loads for a specific processor/VR configuration when a CPU moves into a low power mode. This dynamic phase shedding is typically determined by using a power state indicator (PSI) signal from the processor during dynamic operation of a processor to indicate low power modes of operation. In such a case, the PSI signal is sent to the VR prior to the CPU's transition to a lower power mode. Dynamic phase shedding allows phases to be added or dropped unlimited times depending on PSI signal during operation of the CPU.

One disadvantage with these prior voltage regulator solutions is that they lead to inefficient solutions where a user upgrades or downgrades to a different processor and/or where a manufacturer installs processors with different power needs into the same system motherboard. Voltage regulators designed to handle efficiently high power needs of possible high performance microprocessors that could be installed in such systems suffer from poor power efficiency at lighter loads. As such, when a lower performance microprocessor is installed in the same system, the voltage regulator efficiency suffers.

SUMMARY

Systems and methods disclosed herein provide static phase shedding techniques that improve the efficiency of multiphase voltage regulators within information handling systems by selecting the number of active phases for the multiphase voltage regulators using circuit identifiers (IDs) for circuitry configured to be powered by the multiphase voltage regulators, such as central processing units (CPUs). Static phase shedding allows for selection of the number of phases for a multi-phase voltage regulator that will be active and usable by the system during its operation. The number of phases selected can be from one to the total number of phases within the multi-phase voltage regulator based upon the circuit identification information. For example, processor identifier information for CPUs can be determined during system start-up and/or initialization and then can be used to control the voltage regulator (VR) phase number to provide static phase shedding. This VR control can be implemented, for example, with conventional analog multiphase VR controllers and/or digital VR controllers, as desired. Dynamic phase shedding can also be used in conjunction with this static phase shedding to further reduce the number of active phases when a processor operates in a low power mode. In other embodiments, the static phase shedding techniques described herein can be used for a VR for memory circuitry. For example, the phase number of such a memory VR can be re-configured after memory configuration is identified after the system completes start up initialization. As described below, other features and variations can be implemented, if desired, and related systems and methods can be utilized as well.

DESCRIPTION OF THE DRAWINGS

It is noted that the appended drawings illustrate only exemplary embodiments of the techniques described herein and are, therefore, not to be considered limiting of its scope, for the techniques may admit to other equally effective embodiments.

FIG. 4 is a table diagram showing power loss data and power savings from phase shedding including static phase shedding, where the data is determined for an example voltage regulator using six phases.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The techniques described herein provide static phase shedding techniques that improve the efficiency of multiphase voltage regulators within information handling systems by selecting the number of active phases for multiphase voltage regulators using circuit identifiers, such as microprocessor identifiers (IDs) for central processing units (CPUs). The static phase shedding methods and systems described herein, for example, utilize processor identifier information to control the voltage regulator (VR) phase number. This VR control can be implemented using a variety of techniques, as desired. As used herein, static phase shedding refers to solutions where VR phases are added or dropped after the CPU ID is updated when the system completes a new start-up or initialization, such that the number of phases made active and used within the multi-phase VR is dependent upon the processor ID information.

Prior dynamic phase shedding solutions for CPUs can be used in conjunction with the static phase shedding described herein, if desired. The described embodiments can include the further ability to turn off one or more active phases based upon a PSI (power state indicator) signal from a processor. And the described embodiments can use an additional comparator that causes additional single phase switching regulators to be turned off at a selected low load current thresholds. Unlike this prior dynamic phase shedding, which relies upon PSI signal and/or a determination of load conditions during operation of the processor, the described static phase shedding embodiments initially set the number of active phases for the multiphase voltage regulator based upon a processor identifier information.

Figure 5:
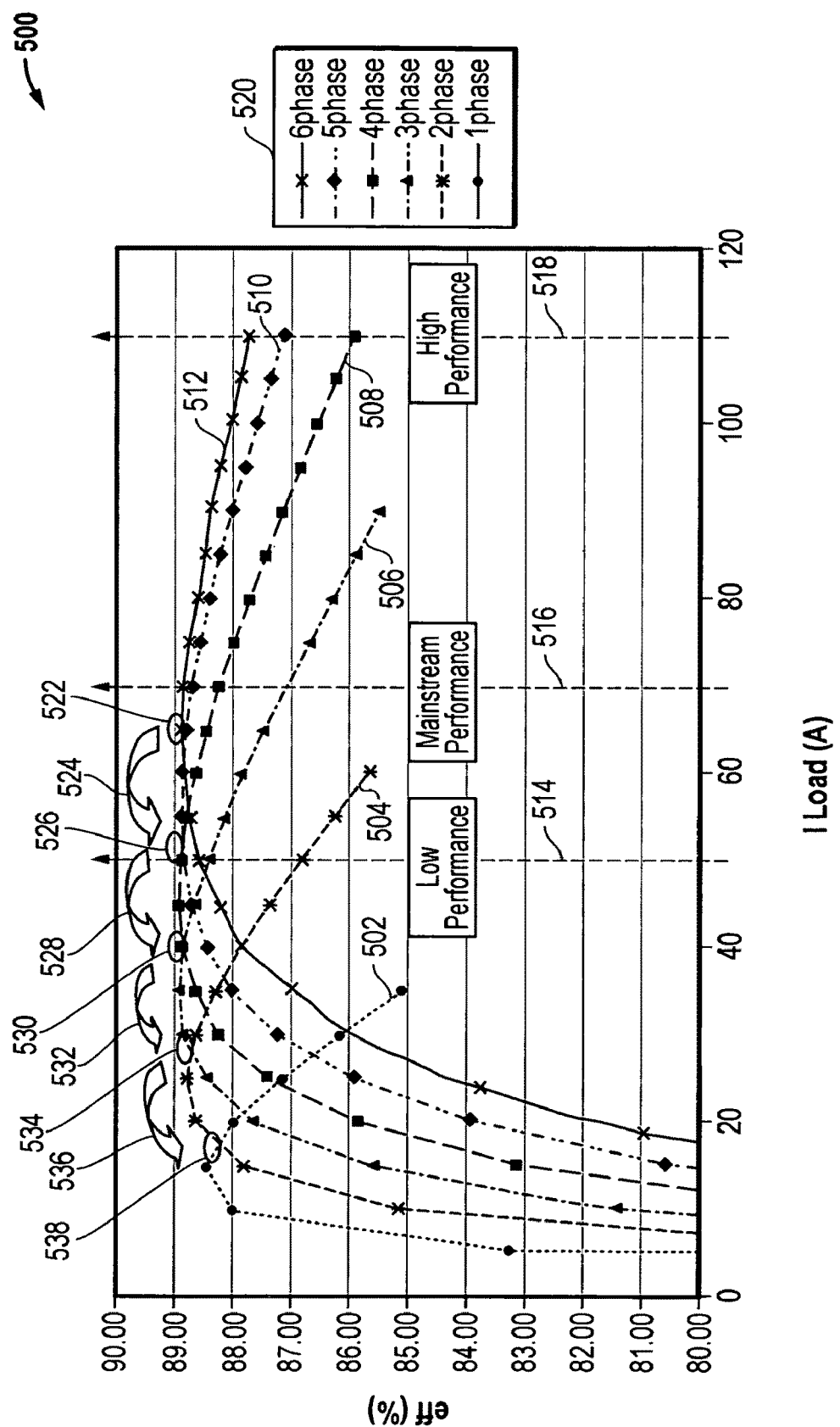
FIG. 5 is a diagram showing efficiencies for different numbers of phases for a multiphase voltage regulator with respect to current loads, where the data is determined for an example voltage regulator using six phases.
Figure 6:
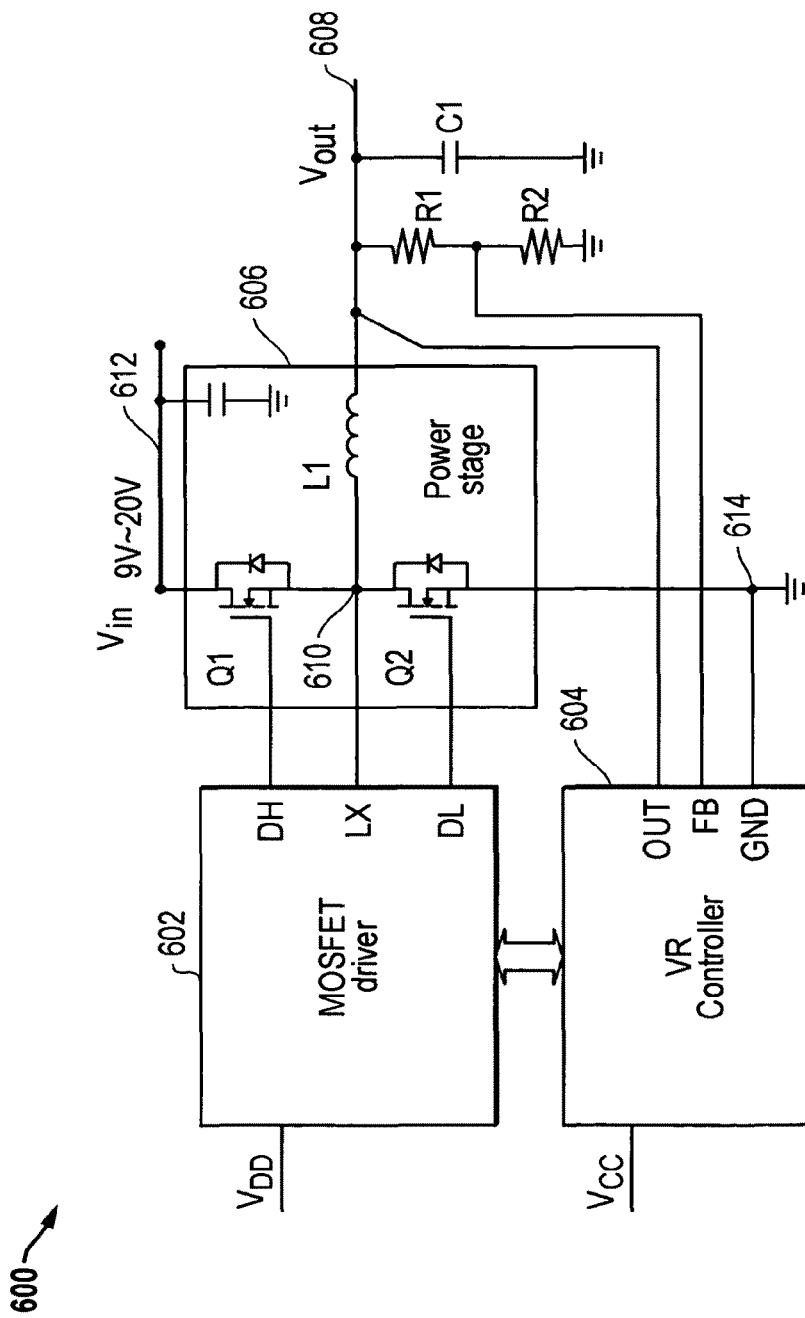
FIG. 6 (Prior Art) is a block diagram for a typical circuit configuration for a single phase voltage regulator power stage.

Advantageously, the disclosed embodiments simplify business operations and systems management by allowing a system motherboard (e.g., server planar) to support several different types of processors having different levels of power requirements. As shown in FIG. 5 and discussed below, efficiency curves vary with the phase number of the voltage regulator (VR) and load current (I Load). As shown, the VRs with more phases suffer from poor power efficiency at light loads. Therefore, as described herein, the phase number of a VR is automatically configured at power-up to maximize efficiency of the VR when the VR is used to support different types of processors with different power level requirements. The disclosed methods and systems use processor IDs to select static phase shedding configurations for VRs in order to support multiple different processors. These disclosed static phase shedding techniques can be implemented, for example, with conventional analog multiphase VR controllers or digital VR controllers.

It is further noted that the disclosed embodiments could also be used for voltage regulators that provide voltages to other circuits besides or in addition to CPUs. For example, the static phase shedding techniques described herein can be used for a VR that provides a regulated voltage to memory circuitry. In such a solution, the phase number of memory VR can be configured when the memory circuitry is identified during system start-up processing. In general, therefore, the number of potentially active phases for the VR can be set based upon an identification information concerning the circuitry to be powered where a plurality of different types of that circuitry may be installed into the same system with the same multi-phase VR. In this way, a single multi-phase VR can be provided in a system solution while still providing the flexibility of allowing the user and/or the manufacturer to install different types of solutions for circuitry within the system. When the system starts-up or initializes, identification information can be obtained concerning the type of circuitry actually installed, and the number of active VR phases can be set accordingly. Thus, while CPU embodiments are primarily discussed below, and memory circuitry is mentioned above, other circuitry could also be powered by VRs for which the number of active phases is set during system start-up or initialization to provide static phase shedding as discussed herein.

Figure 1:
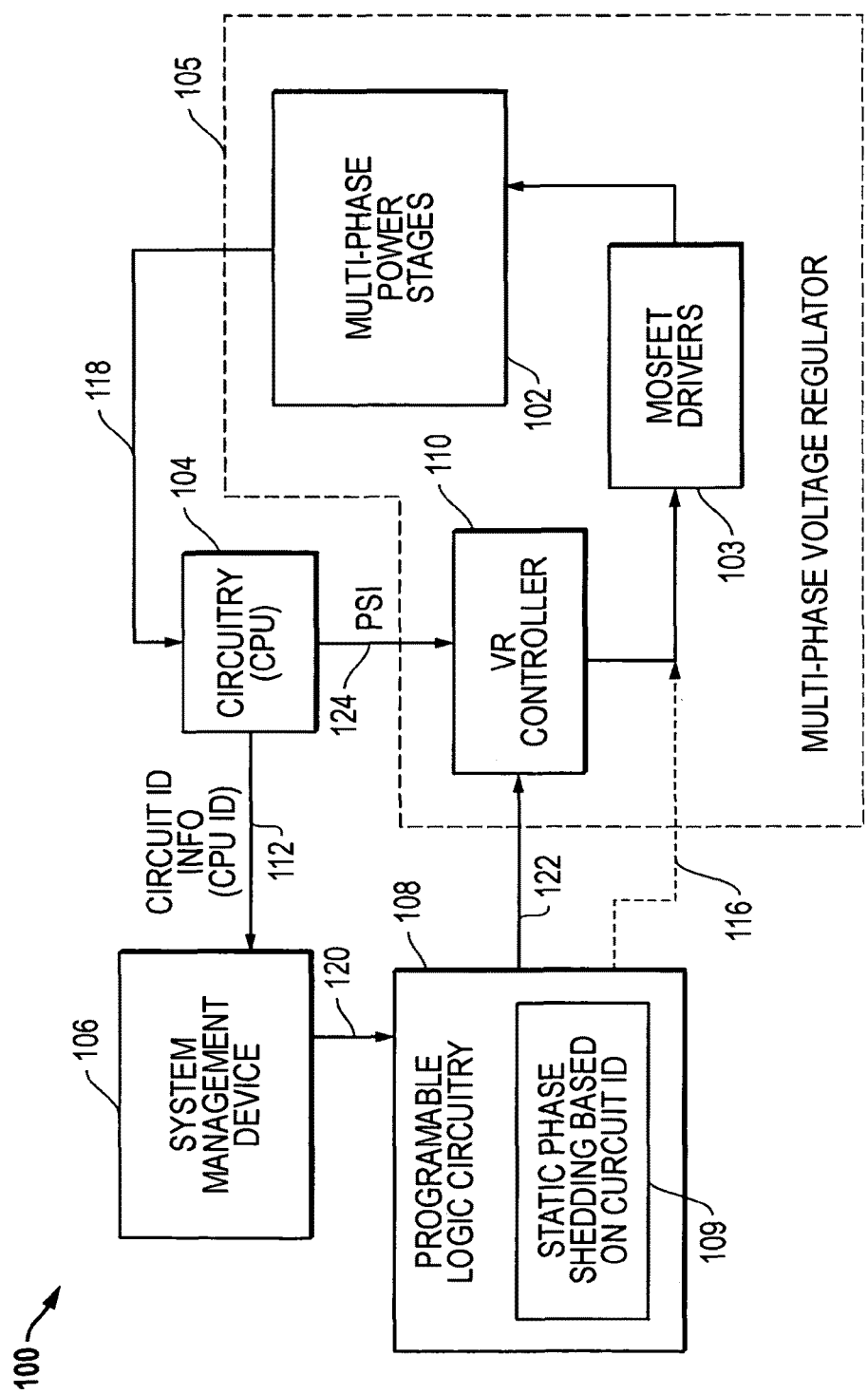
FIG. 1 is a block diagram of an embodiment for a static phase shedding system for controlling a multiphase voltage regulator.

FIG. 1 is a block diagram of an embodiment 100 for a static phase shedding system for controlling a multiphase voltage regulator. As depicted, a multi-phase VR 105 provides regulated voltages to circuitry 104, such as a central processing unit (CPU) through VR lines 118. The circuitry/CPU 104 is coupled to a system management device (SMD) 106, such as board management controller (BMC), and provides circuitry identifier (ID) information 112, such as a CPU ID, to the SMD 106. The SMD 106 is coupled to provide control signals 120 to programmable logic circuitry (PLC) 108, such as a CPLD (complex programmable logic device), configured to provide desired phase control. For example, a static phase shedding control module 109 can be provided within the PLC 108 to provide static phase shedding based upon circuit ID information 112, such as a CPU ID. The PLC 108 in turn sends phase control signals 122 to the VR controller 110. The VR controller 110 in turn provides phase control signals to MOSFET drivers 103. And the MOSFET drivers 103 in turn drive MOSFETs within the multi-phase power stages 102. Alternatively, the PLC 108 can directly provide phase control signals through optional control lines 116. The phase control signals from the MOSFET drivers 103 act to determine the number of active phases for the multi-phase VR 105.

In addition to static phase shedding based upon processor identifier information, as described herein, where the circuitry/CPU 104 is a CPU 104, the CPU 104 may also report a power state indicator (PSI) signal 124 to the VR controller 110. This PSI signal 124 can be used to further reduce the number of active phases when the CPU 104 moves to low power states during its operation, such as when the CPU 104 goes into standby or sleep power modes. Still further, as described above, other dynamic phase shedding techniques can be included in conjunction with the static phase shedding described herein, if desired.

Figure 2:
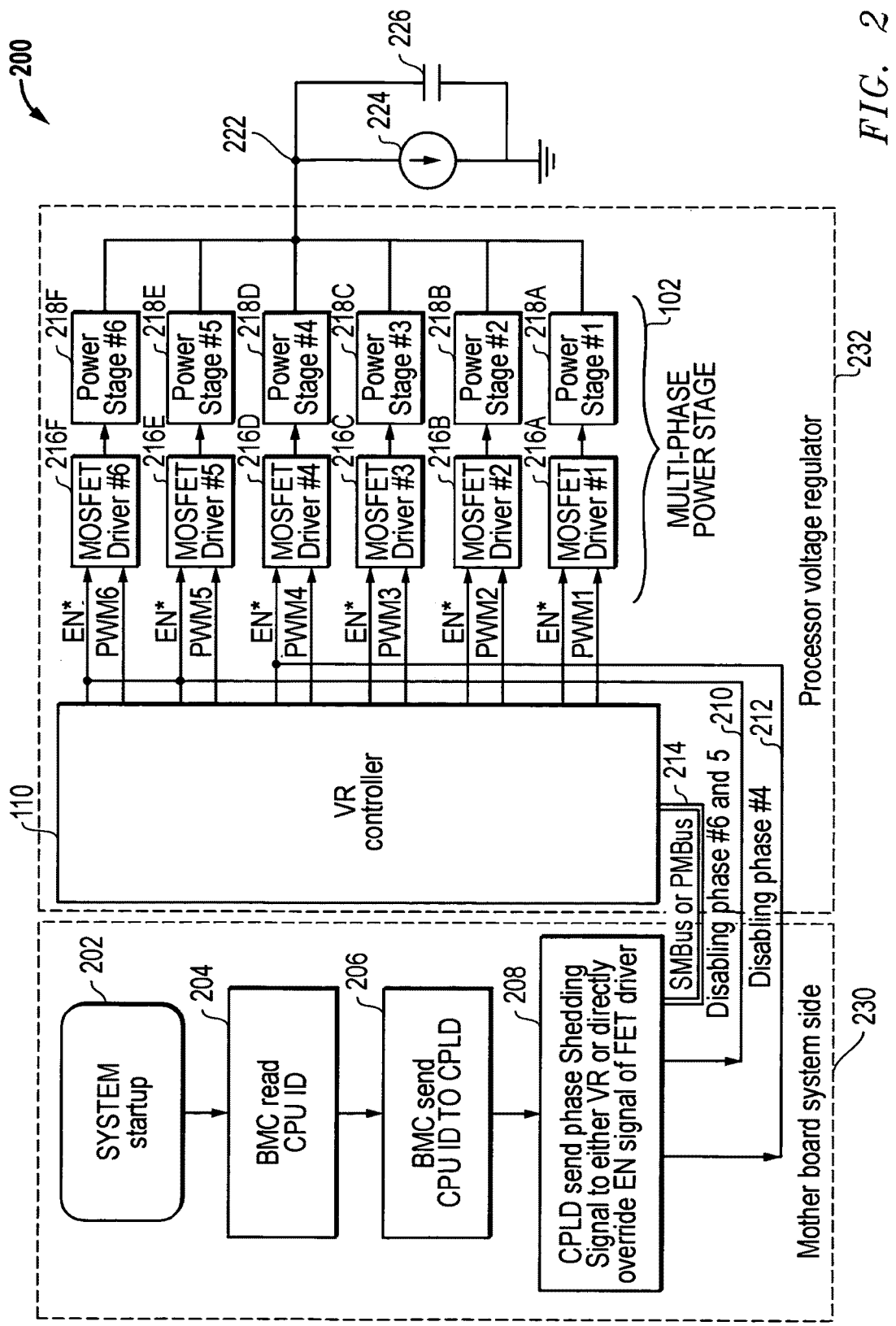
FIG. 2 is a more detailed block diagram for a static phase shedding embodiment based on an example VR using six phases.

FIG. 2 is a more detailed block diagram for an example static phase shedding embodiment 200 using a BMC as the SMD 106 and a CPLD as the PLC 108. As depicted, the embodiment 200 includes mother board system side processes 230 and a processor voltage regulator (VR) 232. The mother board system side processes 230 describe processes that occur in the initialization and selection of the number of active phases for the processor VR 232. The processor VR 232 produces a regulated voltage output 222 that drives a processor load represented by current source 224 and capacitor 226.

Looking to the mother board system side processes 230, block 202 represents the startup of the system. In block 204, a BMC or BIOS (as discussed below) reads and/or receives the CPU ID for the CPU installed in the system. In block 206, the BMC sends the CPU ID to a controller, such as a CPLD, configured to control on board system operations. In block 208, the CPLD sends phase shedding control signals to the VR controller 110, for example, through a system management bus (e.g., SMBus) or a power management bus (e.g., PMBus) 214. Alternatively, as described further below, the CPLD can communicate control signals directly to the VR drivers, for example, through control signals 210 and 212.

It is noted that the techniques by which the CPU ID is obtained can be implemented and adjusted as desired, and the techniques by which the active phases are controlled can also be implemented and adjusted as desired, while still taking advantage of the static phase control methods and systems described herein that select the number of active phases based upon the processor identifier information of an installed CPU. It is also noted, for example, that BIOS (basic input output system) software used for a system could read a CPU ID from a register within an installed CPU and then reported this information to a CPLD. Similarly, a BMC could read such a register and report the CPU ID to control circuitry. Still further, the register holding the CPU ID could be located outside of the CPU itself. In addition, an output pin on the CPU could be used to provide a pin configuration that provides the processor identifier information. In short, many implementations and configurations could be used to obtain and use processor identifier information to select the number of active phases for the multi-phase voltage regulator.

Looking to the processor VR 232 in FIG. 2, a VR controller 110 is coupled to six MOSFET drivers and associated power stages to drive them as a multi-phase VR 102 using a plurality of enable (EN*) signals and pulse width modulation (PWM) signals. It is noted the enable signals (EN*) are active low signals, as depicted.

More particularly, the VR controller 110 is coupled to provide an enable signal (EN*) and a PWM6 signal to MOSFET (metal oxide semiconductor field effect transistor) driver 216F (#6), which in turn drives power stage 218F (#6) to provide VR signals to VR output node 222. The VR controller 110 is coupled to provide an enable signal (EN*) and a PWM5 signal to MOSFET driver 216E (#5), which in turn drives power stage 218E (#5) to provide a VR signals to VR output node 222. The VR controller 110 is coupled to provide an enable signal (EN*) and a PWM4 signal to MOSFET driver 216D (#4), which in turn drives power stage 218D (#4) to provide a VR signals to VR output node 222. The VR controller 110 is coupled to provide an enable signal (EN*) and a PWM3 signal to MOSFET driver 216C (#3), which in turn drives power stage 218C (#3) to provide a VR signals to VR output node 222. The VR controller 110 is coupled to provide an enable signal (EN*) and a PWM2 signal to MOSFET driver 216B (#2), which in turn drives power stage 218B (#2) to provide a VR signals to VR output node 222. The VR controller 110 is coupled to provide an enable signal (EN*) and a PWM1 signal to MOSFET driver 216A (#1), which in turn drives power stage 218A (#1) to provide a VR signals to VR output node 222.

For the embodiment of FIG. 2, a motherboard having three likely installed CPUs is assumed. If a first CPU ID for a high performance CPU were reported, all six phases would be used to power the CPU. If a second CPU ID for a second mainstream or medium level performance CPU were reported, only four phases would be used to power the CPU. And if a third CPU ID for a low performance CPU were reported, only 3 phases would be used to power the CPU. As depicted, therefore, when only four phases are active, the VR controller 110 would use the enable signals for the MOSFET driver 216F (#6) and MOSFET driver 216E (#5) to turn off both the $5^{th}$ and $6^{th}$ phases and thereby leave only four active phases. When only three phases are selected to be active, the VR controller 110 would further use the enable signal for the MOSFET driver 216D (#4) to also turn off the $4^{th}$ phase and thereby leave only three active phases. It is noted that this use of 6 phases, 4 phases and 3 phases, respectfully, for three different expected levels of processor types is only an example and other configurations could be utilized, as desired.

As indicated above, the CPLD or programmable logic circuitry 108 could be configured to provide control signals directly to the VR drivers. And these control signals from the CPLD could be configured to override signals being provided by the VR controller 110. As depicted in FIG. 2, therefore, control signal 210 from the CPLD would turn off the $6^{th}$ and $5^{th}$ phases, and control signal 212 from the CPLD would further turn off the $4^{th}$ phase. In addition, these control signals 210 and 212 could be configured to override any control signals being provide by the VR controller 110, if desired.

In operation of the embodiment depicted in FIG. 2, therefore, the BMC detects the processor ID and sends the processor ID information to the CPLD. The CPLD then communicates phase shedding control signals to the VR controller or directly sends phase shedding control signals to the multi-phase VR. These static phase control signals thereby allow the phase number of the voltage regulator to be configured in a static manner based upon the processor identifier information of the CPU actually installed in the system.

Figure 3:
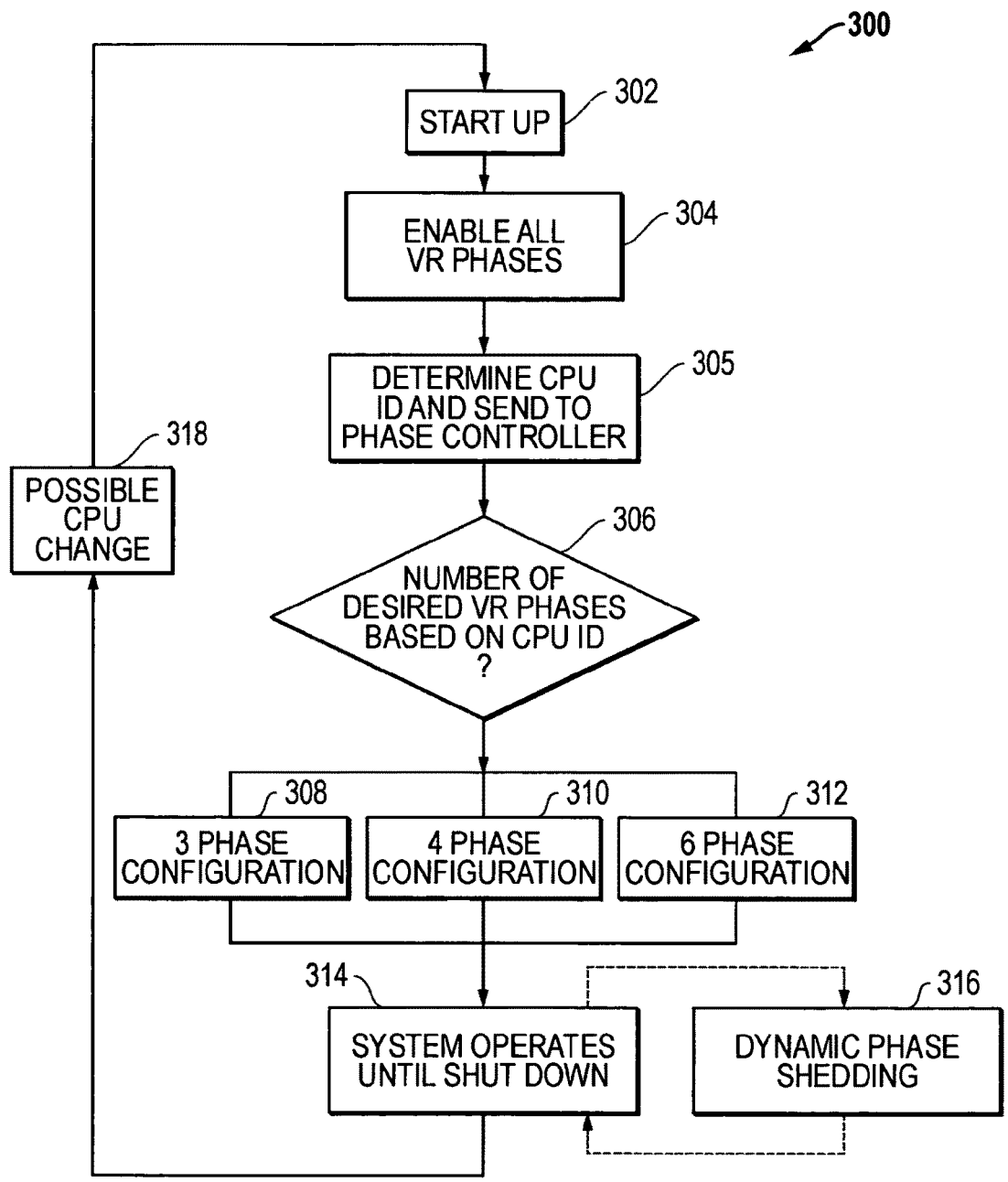
FIG. 3 is process flow diagram for static phase shedding control of a multiphase voltage regulator.

FIG. 3 is process flow diagram of an embodiment 300 for static phase shedding control of a multi-phase voltage regulator where three levels of processors are expected to be installed. Block 302 represents the start-up of the system. In block 304, all VR phases are enabled for maximum power rating capability. In block 305, the CPU ID information is determined and reported to the phase control circuitry. As indicated above, this control circuitry could be implemented using a variety techniques, including the use of a BMC or system BIOS to read the CPU ID from a specific register and then to send the CPU ID information to a programmed CPLD. In decision block 306, a determination is made concerning the desired number of active phases for the VR based upon the power level requirements indicated by the CPU ID. Block 308 is then selected if a 3-phase configuration is desired, for example, where the processor identifier information indicates lower level power requirements. Block 310 is selected if a 4-phase configuration is desired, for example, where the processor identifier information indicates medium level power requirements. And block 312 is selected if a 6-phase configuration is desired, for example, where the processor identifier information indicates higher level power requirements. Flow then passes to block 314 wherein the system operates until shut down. As noted above, during operation of the CPU, dynamic phase shedding for lower power modes and/or lower current load operation could also be provided as represented by block 316 and the dotted connection lines.

As further indicated in FIG. 3, a possible CPU change could occur in block 318 after the system is shut down and before it is again powered up at start up in block 302. When this occurs, the number of active phases selected in decision block 306 can change depending upon the power level requirements indicated by the CPU ID reported in block 305 for the newly installed processor. Advantageously, the static phase shedding embodiments disclosed herein, therefore, allow for more efficient phase selection where different CPUs can be installed in the system. Prior solutions would have a fixed number of active phases depending upon the power level requirements for the highest performance processor planned for the system. For example, a six phase configuration may be the fixed number of active VR phases used if a high performance processor were intended for use in the system, even though lower power processors could also be used in the system. When such a lower level CPU were installed and operated, an inefficient number of phases would be active in the voltage regulator.

FIG. 4 is a table diagram 400 showing power loss data and power saving from phase shedding including static phase shedding, where the data is determined for an example voltage regulator using six phases. The top section 402 of diagram 400 shows power loss data for load current versus number of phases of the voltage regulator. The bottom section 406 of diagram 400 shows power savings provided by implementing dynamic phase shedding during operation of the CPU, for example, as controlled through a PSI signal or a current load analysis. And the middle section 404 of diagram 400 shows power savings provided by static phase shedding as described in the embodiments disclosed herein and as controlled, for example, through a programmed CPLD.

Looking in more detail, the top section 402 shows the power loss experienced with no phase shedding for a variety of load currents (top row) with respect to different numbers of phases for the voltage regulator from 1 phase to 6 phases. The load current is in amps (A) and ranges from 0.0 amps to 70.0 amps in increments of 5 amps. The power loss data is in watts (W). As seen in section 402, the power loss is less for lower phase numbers from a load current of 0.0 to 20.0 amps. However, at 25.0 amps and above, the power loss actually increases at the lower phase numbers. And at 45.0 amps and above, the lowest phase numbers are not viable.

The bottom section 406 shows power savings provided by dynamic phase shedding. From a load current of 0.0 amps to 20.0 amps power savings increase when dynamic phase shedding is used to drop the voltage regulator from 6 phases or 5 phases down to 2 phases or 1 phase. At 25.0 amps and 30.0 amps, however, the power savings become a loss for a drop from 4 phases to 1 phase. Also, in general, the power savings drop as the load current increases. Above a load current of 35.0 amps, the dynamic phase shedding is not a viable option. It is further noted that the numbers in section 406 can be calculated by subtracting the power loss at 6 phases or 4 phases from the power loss at 2 phases or 1 phase, depending upon the reduction in phases being made.

The middle section 404 shows power savings provided by static phase shedding as described with respect to the embodiments disclosed herein. From a load current of 0.0 amps to 45.0 amps, power savings increase when static phase shedding is used to drop the voltage regulator from 6 phases down to 5 phases, 4 phases or 3 phases. At 50.0 amps, however, the power savings become a loss for a drop from 6 phases to 3 phases. At 55.0 amps, the power savings becomes a loss for a drop from 6 phases to 4 phases. At 65.0 amps, the power savings becomes a loss for a drop from 6 phases to 5 phases. Also, in general, the power savings drop as the load current increases. Above a load current of 55.0 amps, the static phase shedding is not a viable option for a drop to 3 phases. It is further noted that the numbers in section 404 can be calculated by subtracting the power loss at 6 phases from the power loss at 5 phases, 4 phases or 3 phases, depending upon the reduction in phases being made.

As set forth in FIG. 4, therefore, the power loss data shows that static phase shedding can provide additional power savings. As described herein, this static phase shedding can be set at power-up of the system using processor identifier information to set the number of active phases for the voltage regulator. As noted above, dynamic phase shedding can also be added to this static phase shedding during operation of the system to reduce the number of phases when the processor is in a low power mode or a low current mode. When the processor goes back to a higher power mode or a higher current mode, these active phases are turned back on up to the number of active phases selected by the static phase shedding.

FIG. 5 is a diagram 500 showing efficiencies for different phase numbers for a multi-phase voltage regulator with respect to current loads. The y-axis represents efficiency percentages (%), and the x-axis represents the current (I) load in amps (A). Element 520 is the legend for the graphical depictions. Line 502 represents a 1 phase voltage regulator efficiency curve. Line 504 represents a 2 phase voltage regulator efficiency curve. Line 506 represents a 3 phase voltage regulator efficiency curve. Line 508 represents a 4 phase voltage regulator efficiency curve. Line 510 represents a 5 phase voltage regulator efficiency curve. And line 512 represents a 6 phase voltage regulator efficiency curve. Each efficiency curve follows data points at various load currents. The circles 522, 526, 530, 534 and 538 represent cross-over points for the efficiency curves for the different phases number configurations. The arrows 524, 528, 532 and 536 represent desired efficiency curve transitions from one VR phase number configuration to another one. Optimally, the VR could be set to automatically follow the arrow transitions across the full load range.

Three processors are also depicted with respect to diagram 500, each having a different power level. A high performance processor is represented by dotted line 518 and has a thermal design current (TDC) or full load of about 110 amps. For this high performance processor, the six phase voltage regulator, as represented by curve 512, provides a good tradeoff in terms of meeting thermal derating at TDC and maximizing efficiency for "sweet" load range from about 20% to 70% of full load (i.e., CPU will typically run in this load range most of the time). A mainstream or medium performance processor is represented by dotted line 516 and has a thermal design current (TDC) of about 70 amps. For this mainstream performance processor, the 4 phase voltage regulator, as represented by curve 508, provides a good tradeoff. A low performance processor is represented by dotted line 514 and has a thermal design current (TDC) of about 50 amps. For this low performance processor, the 3 phase voltage regulator, as represented by curve 506, provides a good tradeoff.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A method for controlling a number of active phases for a multi-phase voltage regulator based upon processor identifier information, comprising:
    obtaining processor identifier information for a central processing unit (CPU) configured to receive regulated voltages from a multi-phase voltage regulator;
    selecting a number of active phases for the multi-phase voltage regulator based upon the processor identifier information, the number of active phases being selected from a total number of available phases within the multi-phase voltage regulator; and
    controlling the multi-phase voltage regulator to provide regulated voltages to the CPU using the selected number of active phases for the multi-phase voltage regulator.

2. The method of claim 1, wherein the obtaining step comprises reading a register on the CPU.

3. The method of claim 1, wherein the obtaining step comprises reading a register outside of the CPU.

4. The method of claim 1, wherein the obtaining step comprises reporting the CPU identifier from the CPU to another integrated circuit.

5. The method of claim 1, wherein the selecting step comprises utilizing a programmable integrated circuit to receive the processor identifier information and to select the number of active phases based upon power requirements indicated by the processor identifier information.

6. The method of claim 1, wherein the controlling step comprises utilizing a voltage regulator controller to send enable signals to determine active stages within multi-phase voltage regulator circuitry.

7. The method of claim 1, wherein the controlling step comprises utilizing override signals to override enable signals from a voltage regulator controller to determine active stages within a multi-phase voltage regulator circuitry.

8. The method of claim 1, wherein the total number of available phases is six phases, and wherein the selecting step comprises selecting six phases, four phases or three phases as the number of active phases depending upon the processor identifier information.

9. The method of claim 1, further comprising turning off one or more of the active phases during operation of the CPU when the CPU operates in a low power mode.

10. The method of claim 9, further comprising receiving a power state indicator signal from the CPU to indicate when the CPU is operating in a low power mode.

11. The method of claim 1, further comprising turning off one or more of the active phases during operation of the CPU when the CPU operates in a low current level.

12. The method of claim 1, wherein the obtaining and selecting steps are conducted at system start-up.

13. A system having a number of active phases for a multi-phase voltage regulator controlled based upon processor identifier information, comprising:
    a central processing unit (CPU) installed within a system;
    a multi-phase voltage regulator coupled to provide regulated voltages to the CPU using a selected number of active phases; and
    control circuitry configured to provide phase control signals to the multi-phase voltage regulator, the phase control signals configured to determine the selected number of active phases for the multi-phase voltage regulator based upon processor identifier information for the CPU, and the number of active phases being selected from a total number of available phases within the multi-phase voltage regulator.

14. The system of claim 13, wherein the CPU comprises a register holding the processor identifier information.

15. The system of claim 13, further comprising a register outside of the CPU configured to hold the processor identifier information and coupled to the control circuitry.

16. The system of claim 13, wherein control circuitry comprises programmable control circuitry configured to receive the processor identifier information and to provide the phase control signals.

17. The system of claim 16, wherein the control circuitry further comprises a board management controller (BMC)

configured to obtain the processor identifier information and report it to the programmable control circuitry.

18. The system of claim 16, wherein the control circuitry further comprises a basic input output system (BIOS) configured to obtain the processor identifier information and report it to the programmable control circuitry.

19. The system of claim 13, wherein the multi-phase voltage regulator comprises a voltage regulator controller configured to provide a plurality of enable signals to a plurality of power stages, and wherein the control circuitry comprises programmable control circuitry configured to receive the processor identifier information and to provide the phase control signals as output signals to the plurality of power stages to override one or more of the plurality of enable signals from the voltage regulator controller.

20. The system of claim 13, wherein the total number of available phases is six phases, and wherein the control circuitry is configured to enable six phases, four phases or three phases as the number of active phases based upon the processor identifier information.

21. The system of claim 16, wherein the multi-phase voltage regulator comprises a voltage regulator controller configured to receive the phase control signals from the programmable control circuitry and to provide a plurality of enable signals to a plurality of power stages.

\* \* \* \* \*